Patented May 18, 1948

2,441,553

UNITED STATES PATENT OFFICE 2,441,553

LIQUID ORGANIC FUMIGANT CONTAINING POLYSTYRENE

Edgar C. Britton, Midland, Mich., assignor to The Dow Chemical Company, Midland, Mich., a corporation of Delaware No Drawing. Application August 3, 1942, Serial No. 453,421

13 Claims. (Cl. 167—39)

This invention relates to improvements in parasite control, and is particularly directed to a novel fumigant composition and an improved fumigation procedure.

Volatile organic liquids have been employed in fumigation procedures for the control of a variety of insect and related pests. The scope of such operation varies from the large scale fumigation of enclosed chambers, rooms, and buildings to the spot fumigation of restricted areas, e. g. borer control, soil fumigation, etc. The problems attendant to such fumigations vary with the particular pest to be controlled and the conditions under which the control is to be accomplished.

Emulsions of ethylene chloride, propylene chloride, and other liquid halo-hydrocarbons have been suggested as toxicants for the control of borer organisms and have replaced solid paradichlorobenzene for such purpose to an appreciable extent. These halo-hydrocarbons serve essentially as fumigants and are more effective at low soil temperatures than is paradichlorobenzene, whereby they may be employed in the late fall, early spring, or even in winter. The use of paradichlorobenzene is generally limited to the warm summer months.

While the use of emulsions of the volatile organic liquids for spot-fumigation constitutes an improvement over previous procedures, disadvantages in such mode of operation have become apparent which threaten to limit substantially the scope of the new practice.

One major problem encountered in this connection is that of maintaining the effective toxicant in sufficiently uniform dispersion to permit close regulation of the amounts applied. The inadequate mixing and application equipment employed by the average operator permits the breaking or stratification of the emulsion during application whereby some trees receive an excessively large amount of the toxicant and others an amount insufficient to accomplish the desired control. This results in inconsistent control of the parasitic organisms with substantial injury and destruction of the trees receiving an overdose of toxicant.

A further difficulty is directly attributable to the flow characteristics of aqueous emulsions of liquid fumigants as heretofore employed. These compositions are of such low viscosity that, when applied to soil around the tree, the emulsion or dispersion tends to be absorbed quickly into the ground and to flow into fissures and soil cracks whereby the root system of the tree is exposed to lethal concentrations of the toxicant. Inability to control the distribution of the toxicant coupled with its high volatility may result in severe injury with the eventual destruction of the tree by amounts of material well within normal tolerance limits.

According to the present invention, there is provided an improved parasiticide composition as a viscous film-forming liquid including a dispersion of a difficultly water-soluble resin in a volatile liquid fumigant. Fumigation operations with such composition are not subject to the disadvantages accruing to the known compositions as outlined above. The dispersion is in the form of a solution, in which the liquid fumigant constitutes the solvent, or of a sol in which the fumigant constitutes the liquid phase of the colloidal solution. The compositions may be prepared by simply dissolving the resin in the liquid fumigant either hot or cold, as required. When resins not freely soluble in the liquid fumigant are employed, colloidal dispersion may be accomplished by dispersing the resin in the hot solvent, by using solubilizing agents, or by subjecting a fine suspension of the resin in the liquid fumigant to the homogenizing action of a colloid mill.

The amount of resin required to impart a suitable viscosity to the composition varies considerably with the particular resin and liquid fumigant employed. From about 3 per cent to about 20 per cent by weight of resin is generally satisfactory depending upon the viscosity desired and the particular materials employed. The new compositions so obtained have reduced flow characteristics and the property of forming a film over the body of the composition upon the initial evaporation of a portion of the liquid fumigant. With the formation of such film, the rate of evaporation of the fumigant is decreased materially so as to provide for a gradual liberation of the toxicant over a considerable period of time. A further advantage in the composition resides in its homogeneity. The active toxicant being the solvent, there is no problem of stratification or separation and the amount of material applied in any treatment can be exactly regulated.

The expression "spot-fumigation," as herein employed, refers to fumigation operations in which a relatively small and restricted area is to be treated rather than to the type of operation wherein an enclosure is subjected to the vapors of the active toxicant. Included within this expression are such procedures as the treatment of trunks or branches of trees for control of wood borers, the treatment of soil adjacent to the trunk and roots of trees for borer control, and the fumigation of soil generally for control of borers, nematodes, worms, and insect larvae.

One use for which the new composition is particularly valuable consists of the control of the peach borer. In such procedure, the composition is applied to the surface of the coil around and adjacent to the trunk of the infested tree. A convenient method of operation is to apply from 0.015 to 1 pint or more of material in a ring around the trunk and ½ to 1 inch therefrom. This application may be made at any time during the year, but preferably at a time when the ground is not frozen and the soil temperature is not appreciably below about 40° C. The material does not spread or flow appreciably, but remains in the form of a ring at the point of application and may be covered with dirt, if desired. Initial evaporation of a portion of the fumigant liquid results in the formation of a film of resin over the surface of the material which substantially limits further evaporation of the fumigant in any direction other than downward into the soil. This evaporation toward the infested area continues with a gradual shrinkage of the ring of fumigant mixture until a collar of resin-residue remains about the base of the tree. This resdue is generally stable and non-injurious to the tree and incapable of poisoning or otherwise affecting the soil. As the peach borer injury takes place only at and immediately below ground level, the restriction of the fumigant material to this area makes possible the use of somewhat reduced amounts of toxicant over those ordinarily employed. The characteristic of not being rapidly absorbed into the soil and of not flowing into soil cracks precludes the building up of lethal concentrations of toxicant in and about the roots and thereby avoids that injury previously characterizing the use of emulsion compositions comprising volatile liquid toxicants.

A further mode of operation consists of the control of wood borers such as the lesser peach tree borer which attack the trunk and branches of growing trees and are frequently found in crotches thereof. In this operation the fumigant mixture may be applied directly to the trunk or crotch of the tree and by reason of its viscosity and low flow characteristics is largely confined to the zone of application.

A further use of the new compositions comprises their application as soil fumigants. Here again the viscosity of the mixture prevents its being rapidly absorbed or dissipated by flowing into soil cracks. As the resin-film forms over the layer of composition as applied, upward evaporation is restricted and a gradual penetration of the toxicant into and through the soil is induced. Such operation eliminates the necessity for covering the treated area with paper and the like as has been common practice with known soil fumigant compositions.

A desirable property of the above-described compositions resides in their incompatability with water. Whereas aqueous emulsions of liquid fumigants are diluted readily by rain or irrigation water so as to break or separate out with the immediate liberation of all of the toxicant material, the present compositions are not so affected but provide for a gradual liberation of the fumigant over a considerable period of time.

The expression "difficultly water-soluble resin," as herein employed, refers to any resin or plastic material capable of being dissolved or colloidably dispersed in the volatile liquid fumigant in such amount as appreciably to increase the viscosity of the latter. A preferred embodiment of the invention resides in synthetic resin materials and particularly in polystyrene.

The expression "liquid fumigant" includes any volatile organic liquid toxic to borer and related insect pests and not excessively injurious to growing plants at the concentrations required. The preferred embodiment of the invention resides in liquid halo-hydrocarbons and more particularly in lower alkylene halides such as ethylene chloride and propylene chloride.

Representative of the resins which may be employed in accordance with the present invention are polystyrene, cellulose ethers, cellulose esters, cellulose nitrate, acrylate and methacrylate polymers, vinyl-type resins, vinylidene chloride polymers and copolymers, butadiene polymers, butadiene-styrene copolymers, polyhydroxy alcohol-polybasic acid resins, shellac, rosin, ester gum, soluble rubber, or mixtures of any two or more of such resins. Among the liquid organic fumigants adapted to for use are ethylene chloride, propylene chloride, methylene chloride, tetrachloroethylene, trichloroethylene, carbon tetrachloride, chloroform, methylchloroform, monochlorobenzene, orthodichlorobenzene, etc.

The following examples illustrate the invention but are not to be construed as limiting.

EXAMPLE 1

10 parts by weight of finely divided polystyrene was dissolved in 90 parts by weight of ethylene chloride to form a viscous solution having an absolute viscosity at 25° C. of 7166 centipoises and a specific gravity of 1.229 at 25°/4° C. This composition was employed as a spot fumigant for the control of peach borer. In one operation, a 20 milliliter portion of the composition was applied in the form of a ring around the base and one-half inch from the trunk of several 2-year old peach trees. The trees were of medium vigor and growing on sandy soil. Air temperature at time of application was 68° C., and soil temperature (at 3 inch depth) was 62° C. The circle of fumigant composition was applied directly to the surface of the soil and not covered after application. The trees appeared normal and showed no sign of injury 5 weeks after treatment. In a similar application at air temperature of 54° C. and soil temperature of 56° C., the ring of fumigant composition was covered with soil. At the end of 3 weeks, there was no indication of any tree injury therefrom. A control determination in which an equivalent amount of dilute aqueous ethylene chloride emulsion was poured into a dike around the base of the tree and covered with soil, caused severe tree injury within 3 weeks of the time of application. This injury was evidenced by the browning of the cambrium layer of both the trunk and the roots of the tree.

Other determinations were carried out on 4 year old peach trees with 50 milliliter portions of the viscous fumigant composition. No injury was observed when the composition was applied as a ring one-half inch from the trunk and on the soil, whether covered or uncovered. A 100 per cent kill of borer was obtained when the fumigant was covered with soil immediately after application. When the parasiticide composition was not covered, the control was 92 per cent. Similarly, 50 milliliter portions of the composition were applied directly to the base of the trunk of certain of the trees without injury thereto. This treatment inhibited attack of the tree by the borers and gave an 88 per cent kill of the organism. The degree of organism control was determined by exhuming the crown and upper roots of each tree two weeks after treatment and examining the surfaces thereof for frass, gum and borers. In control trees severe borer injury was found. The air temperature at time of treatment was 62° C. and the soil temperature was 59° C.

In a further modification, 50 milliliters of the viscous fumigant composition was applied to the crotch of a tree infested with lesser peach tree borer. No effort was made to cover the material after application. No tree injury was observed as the result of this application, and an 88 per cent kill of the borers was accomplished.

In the foregoing fumigations, it was observed that the styrene-containing composition became white in appearance within a few minutes after application by reason of the formation of a surface film of solid polystyrene upon evaporation of a small proportion of the volatile constituent. Between the times of application and inspection, substantially all of the ethylene chloride had evaporated from the composition leaving a deposit of solid polystyrene residue around the base of each tree. It was also observed that the aqueous emulsion employed as a control composition was quickly absorbed by the soil adjacent to the treated trees, and flowed quickly into fissures and soil cracks.

EXAMPLE 2

Methylchloroform and polystyrene were compounded together substantially as described in Example 1 to obtain a viscous fumigant composition containing 10 per cent by weight of the resin. The application of 20 milliliter portions of this composition in a ring one-half inch from the base of the trunk of 2 year old peach trees caused no injury thereto. Similarly, no injury was observed when the composition was applied directly to the trunk of the trees, whether the deposit of fumigant material was covered or uncovered after application. The injury observations were made 3 weeks after application. Application to the soil and adjacent to the trunks of 2 year old trees of a dilute aqueous emulsion comprising an equivalent amount of methylchloroform, caused severe injury within 12 days and very severe injury within 5 weeks.

The foregoing polystyrene-containing composition showed little or no tendency to flow or to soak into the soil upon application, and displayed the same film-forming tendencies as that composition employed in Example 1.

EXAMPLE 3

In a similar fashion, a composition was prepared in which polystyrene and methylene chloride were mixed together to obtain a 10 per cent by weight solution of the resin in the liquid fumigant. 20 milliliter portions of this composition were applied in a circle around the base of 1 and 2 year old peach trees without causing injury to the trees. The soil temperature at the time of application varied from 56° C. to 59° C. at 3 inch depth. Injury observations were made at 3 and 4 week intervals.

50 milliliter portions of the fumigant mixture were applied in a ring adjacent to the base of 4 year old peach trees, and covered with soil. At the end of 5 weeks, the crown and upper roots of the treated trees were examined for borer injury. No indication of such injury was found and 89 per cent of the borer population was found to have been killed. In control trees substantial frass and gum formation on the crown and upper roots indicated severe borer injury.

EXAMPLE 4

Other resins and volatile organic liquid fumigants were substituted for those shown in the preceding examples to obtain fumigant compositions of which the following are representative:

Composition A

| | Parts by weight |
|---|---|
| High viscosity methyl methacrylate | 6 |
| Propylene chloride | 94 |

This composition was a viscous liquid somewhat more free-flowing than that disclosed in Example 1 and well adapted for use in the control of peach borers or nematode infestations.

Composition B

| | Parts by weight |
|---|---|
| High viscosity polystyrene | 6 |
| Tetrachloroethylene | 94 |

This composition had a specific gravity of 1.96 at 25°/4° C. and an absolute viscosity at 25° C. of 3762 centipoises.

Composition C

| | Parts by weight |
|---|---|
| Organo-soluble ethyl cellulose | 12 |
| Propylene chloride | 88 |

This composition was adapted for use in soil fumigation. The absolute viscosity of the mixture in centipoises at 25° C. was 3253, and the specific gravity at 25°/4° C. was 1.15.

While the foregoing examples have been limited to the use of normally liquid toxicants, it is to be understood that the viscous compositions with which the present invention is concerned may be further modified by the inclusion therein of normally gaseous fumigants such as methyl bromide, chloropicrin, carbon dioxide, ethylene oxide, hydrogen cyanide, etc.

I claim:

1. The method of fumigating soils and insect-infested areas on living plants which consists in applying to the same a viscous film-forming liquid composition comprising a liquid organic fumigant having polystyrene dissolved therein.

2. The method according to claim 1, in which the liquid organic fumigant is a volatile liquid halo-hydrocarbon.

3. The method according to claim 2, in which the liquid halo-hydrocarbon is a lower alkylene halide.

4. The method according to claim 3, in which the alkylene halide is ethylene chloride.

5. The method according to claim 3, in which the alkylene halide is propylene chloride.

6. The method of combatting borers in living plants which consists in applying to the soil around the base of the plant a viscous film-forming liquid composition comprising a liquid organic fumigant having polystyrene dissolved therein.

7. The method according to claim 6, in which the liquid organic fumigant is a volatile liquid halo-hydrocarbon.

8. The method according to claim 7, in which the liquid halo-hydrocarbon is a lower alkylene halide.

9. The method according to claim 8, in which the alkylene halide is ethylene chloride.

10. The method according to claim 8, in which the alkylene halide is propylene chloride.

11. A viscous film-forming liquid fumigant composition, which comprises a solution of polystyrene in a lower alkylene halide containing from 3 to 20 per cent by weight of the polystyrene.

12. A fumigant composition according to claim 11, in which the alkylene halide is ethylene chloride.

13. A fumigant composition according to claim 11, in which the alkylene halide is propylene chloride.

EDGAR C. BRITTON.

REFERENCES CITED

The following references are of record in the file of this patent:

UNITED STATES PATENTS

| Number | Name | Date |
|---|---|---|
| 1,897,573 | Curran | Feb. 14, 1933 |
| 2,180,744 | Maxcy | Nov. 21, 1939 |
| 2,274,749 | Smyers | Mar. 3, 1942 |
| 2,318,121 | Widmer | May 4, 1943 |

FOREIGN PATENTS

| Number | Country | Date |
|---|---|---|
| 455,605 | Great Britain | Oct. 23, 1936 |